United States Patent Office 3,522,553
Patented Aug. 4, 1970

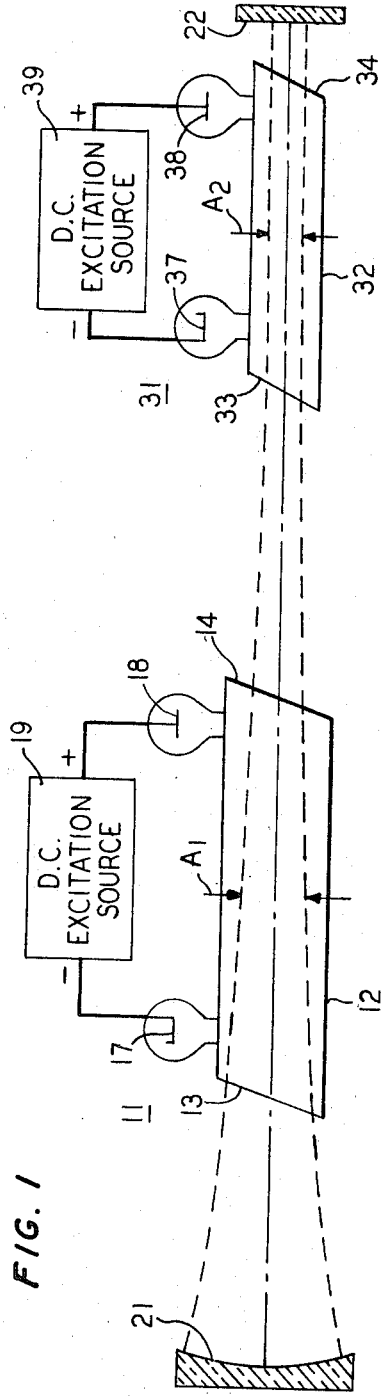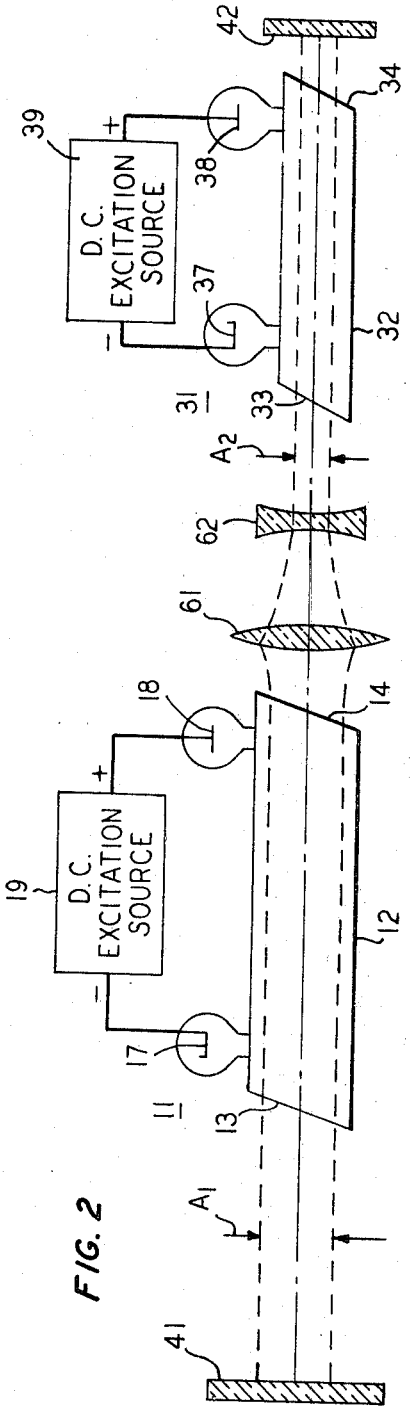

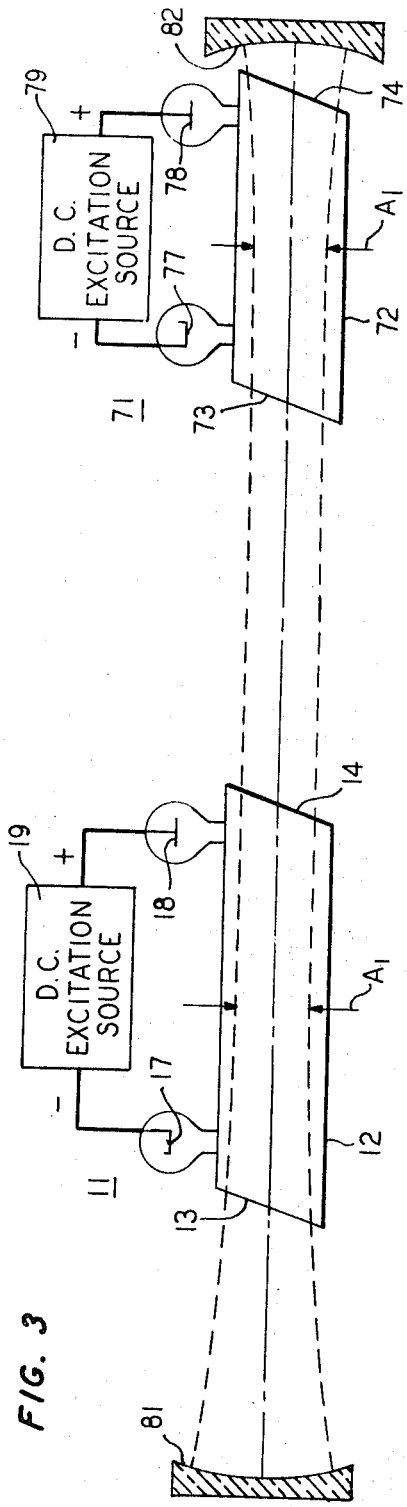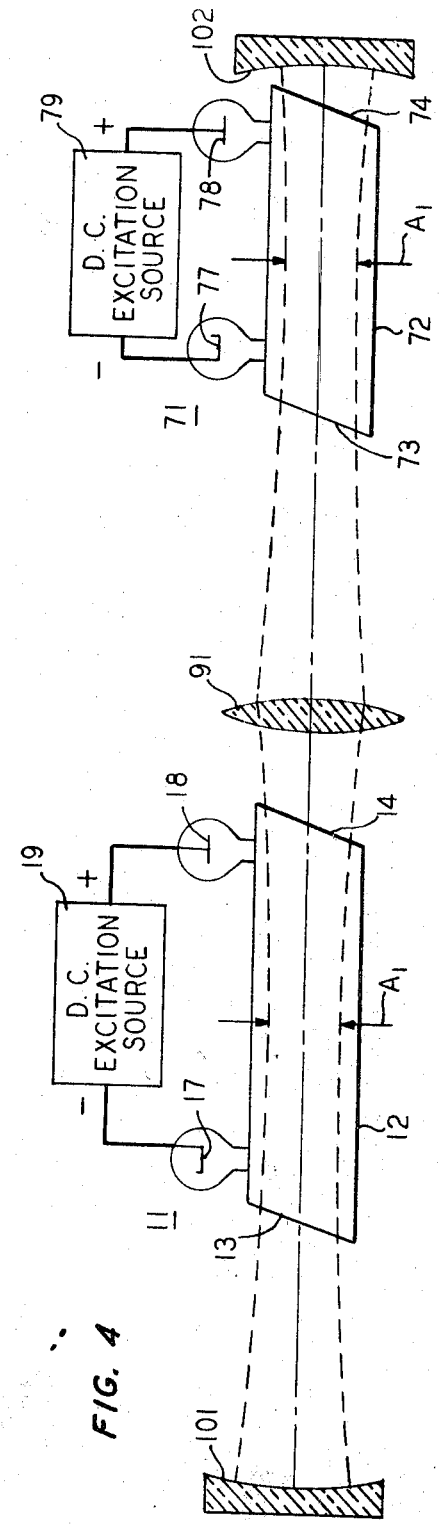

3,522,553
PULSED LASER EMPLOYING AN ACTIVE ABSORPTION CELL
Arthur G. Fox, Rumson, N.J., assignor to Bell Telephone Laboratories, Incorporated, Murray Hill, N.J., a corporation of New York
Filed Mar. 18, 1968, Ser. No. 713,798
Int. Cl. H01s 3/10
U.S. Cl. 331—94.5      8 Claims

ABSTRACT OF THE DISCLOSURE

A laser that oscillates in multiple modes is pulsed by a mutual adaptation of an absorption cell having a substantially matching absorption line and the other components of the laser to couple the modes of the laser by saturable absorption with time constants that permit the cell to return its initial absorption condition at least once for every two passages of a pulse through the cell. Two distinct embodiments employ, respectively, single passage of a pulse and double passage of a pulse through the cell during an absorption cycle.

BACKGROUND OF THE INVENTION

This invention relates to techniques for pulsing lasers.

It is sometimes remarked that lasers represent a solution in search of a problem. Nevertheless, it is known what sorts of problems lasers might solve if they can achieve appropriate characteristics. For example, it is presently believed that lasers might be most usefully employed in communication systems when operated in a manner that provides pulses of very narrow width that can be interleaved in large numbers in order to reduce the interpulse spacing.

For example, in the copending application of L. E. Hargrove, Ser. No. 362,319, filed Apr. 24, 1964, and assigned to the assignee hereof, a technique is disclosed for pulsing a laser by modulating the loss of the resonator with an electro-optic modulator at the mode spacing rate, $c/2L$. Pulsing at this rate is typically called synchronous pulsing. In this formula, $c$ is the speed of light and $2L$ is the round-trip length within the laser resonator. The foregoing form of modulation is sometimes termed "loss modulation." It is also known that non-lossy or "reactive" techniques of modulation will produce laser pulsing.

It has recently been observed that lasers can pulse at the mode spacing rate in the absence of any modulation or other deliberate perturbation of the laser. This pulsing has been termed self-pulsing. Most self-pulsing lasers have relatively long optical resonators, and according to my analysis, the long resonators permit the population inversion of the active medium to recover between passages of the pulse. Nevertheless, the observed self-pulsing of lasers is not predictable and reliable and may easily switch to a regime of operation in which the longitudinal modes free-run and the output power is more or less continuous.

I have recently developed a theory which shows that, in a self-pulsing laser, the pulses will be approximately "$\pi$ pulses" in the laser active medium. This terminology draws upon an analogy to the magnetic resonance art, where it is already known that a pulse of oscillating magnetic field of a certain strength and duration is effective to flip magnetic resonance dipoles in a material by exactly 180 degrees. Such a pulse is termed a "$\pi$ pulse." The analogous laser pulse in my theory, in one passage through the laser medium, removes all available energy from the medium, leaving an excess of atoms in the lower energy level in the same amount by which there was initially an excess of atoms in the upper energy level. The initial upper level excess is then reestablished by the normal pumping process prior to the next passage of the pulse through the medium.

Other types of pulsed lasers have been developed which pulse at rates substantially lower than the mode spacing rate. These techniques can generally be characterized as employing a bleachable absorption cell. The more common ones employ organic dye cells as the bleachable absorption cell. Recently, similar pulsing has been obtained in an absorption cell having discrete energy levels separated by the photon energy of the laser radiation. Such an arrangement employing a gallium arsenide injection laser and a gallium arsenide absorption cell is disclosed by Yu. A. Drozhbin et al., "Generation of Ultraviolet Light Pulses with a GaAs Semiconductor Laser," Soviet Physics, JETP Letters, volume 5, page 143, Mar. 15, 1967. For many applications, the lower pulsing rate thus obtained is inadequate.

SUMMARY OF THE INVENTION

It is an object of this invention to produce synchronous pulsing, that is, pulsing at the mode spacing rate, of a laser, both reliably and without an external modulation signal at the mode spacing frequency.

According to my invention, I have discovered that synchronous pulsing can be produced by using a saturable absorption cell in such a way that negligible energy is lost from the resonator to the absorption cell. More specifically, the laser pulses, which will be $\pi$ pulses for the laser active medium, should look like $\pi$ pulses or $2\pi$ pulses to the medium of the saturable absorption cell. By analogy with the preceding definition of a $\pi$ pulse, a $2\pi$ pulse is that pulse which twice flips the relative populations of two energy levels and returns the absorption cell to its initial condition at the end of every single passage therethrough.

According to one aspect of my invention, the absorbing medium of the saturable absorption cell must have an energy storage lifetime $T_1$, often called a fluorescence lifetime, which is substantially greater than the pulse width and, in addition, a homogeneous dephasing lifetime $T_2^*$ for the radiating population which is also substantially greater than the pulse width. In the typical case in which the saturable absorption cell medium has discrete energy levels separated by the photon energy of the laser radiation, the energy storage lifetime $T_1$ is simply the lifetime of an excited particle in the upper of the two energy levels. The homogeneous dephasing lifetime $T_2^*$ is a lifetime which is always less than the energy storage lifetime $T_1$ and which is the period of time after which an ensemble of particles that have been stimulated to a coherently radiating state lose their phase coherence and hence lose their ability to radiate coherently. In a gas laser, the homogeneous dephasing lifetime is brought about by collisions within the gas.

The significance of the homogeneous dephasing lifetime can best be understood by relating it to the prior art, such as the arrangement disclosed in the above-cited article by Drozhbin et al. In that arrangement, a homogeneous dephasing lifetime $T_2^*$ less than the pulse width produces bleaching of the absorption cell. In this bleaching, the energy is stored in the cell but cannot be recovered coherently therefrom by the laser radiation. This fact may be deduced from the disclosed frequency of pulsing which is more than an order of magnitude less than any probable mode spacing rate for such a device. Such pulsing rates are produced by a bleaching phenomenon; and, because of the bleaching, energy is lost from the laster radiation to the saturable absorption cell. Several passes of the radiation are required to produce full bleaching. Such pulsing rates occur only when the homogeneous dephasing lifetime $T_2^*$ is less than the pulse width.

Typically, $T_1$ will be several times larger than $T_2^*$. The pulse width is approximately $2L/Nc$, where N is the number of longitudinal modes oscillating.

According to one feature of my invention based upon the above-described relationships between lifetimes and the pulse width, I have discovered that, in a gas laser, a gas absorption cell having energy levels separated by the photon energy of the laser radiation will produce synchronous pulsing when the gas pressure in the absorption cell is below a critical level. For this condition, the homogeneous dephasing lifetime $T_2^*$ is greater than the pulse width. A gas may be readily chosen which has a sufficiently long energy storage lifetime $T_1$ of the upper of the two levels between which absorption occurs. Typically, the gas absorption all may use the same gas as the lasing gas component of the laser active medium. For example, for a helium-neon laser operating at 6328 angstrom units, the absorption cell may employ pure neon at a pressure of approximately 3 torr or less. Satisfactory operation has been obtained for absorption cell pressures between 0.1 torr and 3 torr.

In a first specific embodiment of my invention employing $2\pi$ pulse operation, there is provided a mutual adaptation of the absorption cell and the other components of the laser to provide twice the electric field strength, assuming like electric dipole moments of the gain and absorption media, in the absorption cell as exists in the laser active gain medium during passage of its $\pi$ pulse. For absorption medium having an electric dipole moment, or oscillator strength, different from that of the active medium, the electric field needed for $2\pi$ pulse operation depends inversely upon the electric dipole moment of the absorption medium and is adjusted accordingly. Thus, the absorption cell passes a $2\pi$ pulse, as defined above. The $2\pi$ pulse "flips" the cell from absorption condition to an inverted population condition; and then the cell "flips back" and returns the absorbed energy coherently to the pulse before it leaves the cell. Thus, the cell returns to its initial absorption condition at the end of every single pass of the pulse therethrough. The operation of the cell in this embodiment is characterized by the typical time delay of self-induced transparency, as described by S. L. McCall and E. L. Hahn, "Self-Induced Transparency by Pulsed Coherent Light," Physical Review Letters, pages 908–911, May 22, 1967. The appropriate electric field strength in the absorption cell is provided by appropriate shaping of the beam, illustratively by focusing. The location of the active absorption cell within the laser optical resonator in this embodiment is noncritical. Therefore, this embodiment can optionally take the form of a ring laser.

According to a second specific embodiment of my invention employing $\pi$ pulse operation, the absorption cell and the other components of the laser are mutually adapted to provide the same electric field strength in the absorption cell as in the laser active medium, provided the two media have like electric dipole moments. For an absorption medium having an electric dipole moment, or oscillator strength, different from that of the active gain medium, the electric field strength is adjusted inversely to the electric dipole moment, in order to produce $\pi$ pulses. The cell is then returned to its initial absorption condition once during every two passes of the laser radiation by disposing it in close proximity to one reflector of a linear laser resonator so that the radiation undergoes two passes through the active absorption cell substantially continuously and before any substantial part of the population of the upper state in the absorption cell can relax spontaneously (dephase). Other arrangements for providing two substantially continuous passages of the laser radiation through the absorption cell would also suffice. The radiation will then induce those atoms to give back their energy and return to the lower state. This embodiment does not have the characteristic time delay of self-induced transparency. In this embodiment, both the laser active medium and the absorption cell operate with $\pi$ pulses.

BRIEF DESCRIPTION OF THE DRAWING

Further features and advantages of my invention will become apparent from the following detailed description, taken together with the drawing, in which:

FIG. 1 is a partially pictorial and partially block diagrammatic illustration of the first embodiment of the invention;

FIG. 2 is a partially pictorial and partially block diagrammatic illustration of a modification of the embodiment of FIG. 1 employing lenses;

FIG. 3 is a partially pictorial and partially block diagrammatic illustration of the second embodiment of the invention; and FIG. 4 is a partially pictorial and partially block diagrammatic illustration of a modification of the embodiment of FIG. 3.

DESCRIPTION OF ILLUSTRATIVE EMBODIMENTS

In FIG. 1, the illustrated apparatus produces laser pulses according to the first embodiment of my invention in which the active medium of a laser 11 transmits $\pi$ pulses like those of a self-pulsing laser while an active absorption cell responds to the pulses as $2\pi$ pulses.

The active gain medium is illustratively a mixture of helium and neon in a ratio of 10:1 and is capable of laser oscillation at 6328 angstrom units. It is contained in a suitable cylindrical tube 12 having Brewster angle end windows 13 and 14. The active gain medium is excited, or pumped, by means of a direct-current electrical discharge between cathode 17 and anode 18 connected across a direct-current voltage source 19. The laser active medium is disposed in a linear optical resonator comprising reflectors 21 and 22 opposed along an axis coinciding with the axis of tube 12. The respective curvatures of reflectors 21 and 22 are adapted so that the mean diameter of the beam in the vicinity of reflector 21, i.e., the diameter $A_1$, is twice the mean diameter of the beam in the vicinity of reflector 22, i.e., the diameter $A_2$. The active gain medium is disposed so that it experiences the mean diameter $A_1$.

An active absorption cell 31 includes a gaseous medium of neon and is disposed in tube 32 to experience the mean diameter $A_2$ of the beam. Tube 32 has Brewster angle end windows 33 and 34. The cell 31 also includes a cathode 37 and an anode 38 and a direct-current voltage source 39 connected between electrodes 37 and 38. It will be noted that the upper and lower levels providing the absorption are respectively the same as the upper and lower levels of the lasing transition of the active medium in tube 12.

The total pressure of the active medium within the laser tube 12 is illustratively 3 torr, the discharge length is illustratively 100 centimeters and the excitation power level is illustratively 30 watts. These parameters for the laser active medium can all be varied within the ranges known in the laser art.

Illustratively, the pressure in tube 32 is 0.3 torr, but could vary up to 3 torr or more. Successful operation has been obtained at 3 torr. Its length is illustratively 50 centimeters. Its excitation power is illustratively 10 watts. The spacing between end window 34 and reflector 22 in noncritical.

The typical radius of curvature of reflector 21 is 200 centimeters; and reflector 22 is illustratively substantially flat. Reflector 21 is partially transparent to permit the extraction of a portion of the laser oscillation. The spacing between reflectors 21 and 22 is illustratively 200 centimeters.

In the operation of the embodiment of FIG. 1, the presence of the saturable active absorption cell 31 induces mode-locking of a multiplicity of longitudinal modes supported by the resonator, the active medium of laser 11 and its pumping means. The pumping means must supply sufficient power to permit the plurality of modes to oscillate.

In the embodiment of FIG. 1, mode-locking is produced reliably by the cooperation of the normal components of a self-pulsing laser and the added active absorption cell 31. The pulses obtained can be substantially shorter than those obtained from a self-pulsing laser. Moreover, this pulsing is obtained without the complexities and power losses of a crystal modulator and its driving circuitry.

The absorption cell 31 presents to the laser beam a temporary absorption (loss or negative gain) which is considerably lower than the gain provided by the active medium of laser 11. The negative gain is provided by a larger initial population of atoms in the lower level than in the upper level. This can be provided by either a shorter path length as shown, a lower pressure of neon in the absorption cell, or a lower pumping current, as compared to the active gain medium.

More specifically, the operation of the embodiment of FIG. 1 takes advantage of beam shaping by the reflectors 21 and 22 to provide a mean diameter ratio of 1:2 between the portion of the beam in the laser active medium and the portion of the beam in the active absorption cell medium, respectively. The power intensity will be in a ratio of 1:4; and the electric field strengths will be in the ratio of 1:2. Then a $\pi$ pulse in the laser medium is a $2\pi$ pulse in the absorption cell 31 and the cell absorbs very little power. A $2\pi$ pulse first excites, then de-excites the absorbing atoms, leaving them in the lower level. The $2\pi$ pulse passes with little attenuation but with some characteristic delay, strikes the reflector 22, is returned, and again passes through without substantial attenuation.

Only if the laser operates with $\pi$ pulses will the absorption cell treat them kindly. If quasi-continuous-wave or free-running operation should start to occur, the cell would absorb irreversibly. Therefore, the active absorption cell 31 suppresses free-running operation and compels $\pi$ pulse operation of the combined laser apparatus. The pulse repetition rate is somewhat less than $c/2L$ because of the characteristic time delay of self-induced transparency.

In absorption cell 31, the number of lower state (absorbing atoms) will be determined by the discharge current, since in the absence of a discharge, the lower laser level, as well as the upper laser level, is negligibly populated. This characteristic of a three-level laser medium used as the saturable absorber should allow considerable flexibility in the design parameters. Little loss of the laser radiation occurs in the absorption cell 31 because its homogeneous dephasing lifetime, $T_2^*$, is substantially greater than the pulse width. It is expected that this relationship can be readily obtained in gases and other absorbing media having inhomogeneously broadened absorption lines. Inhomogeneous broadening is a broadening of the gain curve or absorption loss curve, in this case, such that depleting the gain at one frequency does not substantially deplete the available absorption at other frequencies relatively widely separated from the one frequency within the broadened curve. Nevertheless, our invention is not limited to inhomogeneously broadened absorption media.

Exactly the same mode of operation can be achieved in an optical resonator having reflectors 41 and 42 that are both substantially flat, as shown in the modified embodiment of FIG. 2. In FIG. 2, the 1:2 relative diameter ratio of the beam in the laser 11 and the absorption cell 31 is achieved by lenses 61 and 62 disposed within the optical resonator along the axis thereof. The lenses 61 and 62 are illustratively disposed between the laser 11 and the active absorption cell 31 and provide essentially parallel beams through both the laser 11 and the absorption cell 31. A single lens in any suitable position in the optical resonator will suffice if one wishes to permit a more divergent beam in at least one of the two tubes 12 and 32.

If the absorption cell is placed so that it sees exactly the same mean intensity as the laser tube, when both media have like electric dipole moments, a $\pi$ pulse in the laser active medium is also a $\pi$ pulse in the absorption cell. A double passage of a pulse through the absorption cell, if accomplished in less than the homogeneous dephasing lifetime, $T_2^*$, will then return the absorption cell to its initial state. Such a second embodiment of my invention is illustrated in FIG. 3.

In FIG. 3, the laser 11 including active medium and excitation means is substantially similar to the corresponding apparatus 11 of FIG. 1. The laser 11 is disposed within the optical resonator comprising opposed reflectors 81 and 82. Also disposed therein in alignment along the common axis is the tube 72 of an active absorption cell 71. This tube 72 has a discharge length of 10 centimeters, which is less than half the distance traversed by the pulse during the dephasing lifetime $T_2^*$ of atoms in the upper level of the two levels involved in the absorption. It also is disposed as close as possible to reflector 82. The tube 72 has Brewster angle end faces 73 and 74 and is energized by cathode 77 and anode 78 connected across the direct-current voltage source 79.

The excitation power of laser 11 and the gas pressure in tube 12 are the same as for FIG. 1 and for FIG. 2. The pressure of the neon in absorption cell 72 is again 0.3 torr. In the operation of the embodiment of FIG. 3, a $\pi$ pulse in the laser is also a $\pi$ pulse in the active absorption cell 71. The pulse will then be attenuated in the cell 71 but will elevate the lower atoms to the upper state. Since it passes through the cell 71 and then returns through the cell, i.e., through the tube 72, in a time shorter than the dephasing lifetime $T_2^*$ of the atoms in the upper state, it will induce them to give back their energy and return to the lower state. This operation is facilitated by the shortness of the tube 72 and its placement in close proximity to the reflector 82.

The absorption and coherent re-radiation occurring in cell 71 during every two passages therethrough occurs without the characteristic time delay of the operation of embodiments of FIGS. 1 and 2. Therefore, the pulse repetition frequency is determined by the round-trip path length in the resonator modified only by the normally refractive index of all the several media within the resonator.

Substantially the same mode of operation can be achieved in the modified embodiment of FIG. 4, in which part of the focusing action provided by reflectors 81 and 82 of FIG. 3 is now provided by the lens 91. In other respects, the modified embodiment of FIG. 4 is identical to and operates in the same way as the embodiment of FIG. 3.

I claim:
1. A laser comprising
an active gain medium capable of the stimulated emission of coherent radiation,
means for pumping said active medium,
an optical resonator of length L disposed about said medium,
said medium pumping means and said optical resonator being mutually adapted to enable a plurality, N, of longitudinal modes to oscillate, and
an absorption cell disposed within said resonator, said cell comprising
an absorbing medium having discrete energy levels at least two of which are separated by approximately the photon energy of the laser radiation, said absorbing medium having an energy storage lifetime $T_1$ substantially greater than the expected pulse width $2L/Nc$, where $c$ is the velocity of light, and having a homogeneous dephasing lifetime $T_2^*$ substantially greater than said pulse width, means for providing in said absorbing medium a population of the lower of the two levels greater than the population of the upper of the two levels by an amount still permitting laser oscillation, said cell being disposed and mutually adapted with respect to the other components of said laser to absorb energy from a pulse of said radiation and then return the energy to said pulse at least once for every two passes of said pulse through said cell.

2. A laser according to claim 1 in which electric field strengths and electric dipole moments in the active gain medium and the absorption medium are mutually adjusted for $\pi$ pulse or $2\pi$ pulse operation.

3. A laser according to claim 1 in which the mutual adaptation of the absorption cell and the other components of the laser comprises a gaseous absorbing medium, said absorbing medium having a pressure equal to or less than a value providing a homogeneous dephasing lifetime greater than the pulse width.

4. A laser according to claim 3 in which the mutual adaptation of the cell and the other components of the laser include means within the laser for providing an electric field strength of the radiation in said active absorption cell medium that is adjusted relative to the field strength of said radiation in the laser active medium and the electric dipole moments of said media for $2\pi$ pulse operation, whereby the absorption cell absorbs energy from said radiation and then returns the absorbed energy to said radiation during every single pass of said radiation through said absorption cell.

5. A laser according to claim 4 in which the electric field strength providing means comprises at least one lens disposed between the laser active gain medium and the active absorption cell medium to focus the radiation in said active absorption cell medium to a cross-sectional diameter one-half of a corresponding cross-sectional diameter of said radiation in the laser active medium, the electric dipole moments of said media being substantially equal.

6. A laser according to claim 4 in which the electric field strength providing means includes an adaptation of the resonating means in which focusing reflectors produce a beam of said radiation having a first diameter in a first locality and a second diameter half as great as the first diameter in a second locality, the electric field strength providing means further comprising disposition of the laser active gain medium in the first locality and the active absorption cell medium in the second locality, the electric dipole moments of said media being substantially equal.

7. A laser according to claim 3 in which the adaptation of the cell includes means for providing electric field strengths of the radiation in the laser active medium and in the active absorption cell medium that are mutually adjusted relative to the electric dipole moments of said media for $\pi$ pulse operation, the homogeneous dephasing lifetime of the upper level of the absorbing medium being greater than twice the pulse width, and further includes a length of the active absorption cell less than the distance traversed by the radiation in half said dephasing lifetime and a disposition of the cell within the resonating means to experience two substantially continuous passages of said radiation.

8. A laser according to claim 7 in which the resonating means is a linear optical resonator comprising two reflectors opposed along an axis extending through said laser active medium and said active absorption cell medium, said absorption cell being disposed in proximity to one of said reflectors.

References Cited

UNITED STATES PATENTS 3,321,714   5/1967   Tien.

OTHER REFERENCES

Fox et al.: Mode-Locked Laser and the 180° Pulse, Phys. Rev. Letters, vol. 18, No. 20 (May 15, 1976), pp. 826–828.

Garmire et al.: Laser Mode-Locking with Saturable Absorbers, IEEE J. Quant. Elect., vol. QE–3, No. 6 (June 1967), pp. 222–226.

RONALD L. WIBERT, Primary Examiner

W. L. SIKES, Assistant Examiner

U.S. Cl. X.R.

350—160